United States Patent
Rashid et al.

(10) Patent No.: US 9,560,558 B2
(45) Date of Patent: Jan. 31, 2017

(54) REDUCED HANDOVER LATENCY FOR LICENSED SHARED ACCESS

(71) Applicant: Intel Corporation, Santa Clara, CA (US)

(72) Inventors: Mohammad Mamunur Rashid, Hillsboro, OR (US); Satish Chandra Jha, Hillsboro, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 14/280,149

(22) Filed: May 16, 2014

(65) Prior Publication Data

US 2015/0334610 A1 Nov. 19, 2015

(51) Int. Cl.
*H04W 36/00* (2009.01)
*H04W 68/02* (2009.01)
*H04W 36/06* (2009.01)

(52) U.S. Cl.
CPC ......... *H04W 36/0072* (2013.01); *H04W 68/02* (2013.01); *H04W 36/0055* (2013.01); *H04W 36/06* (2013.01)

(58) Field of Classification Search
CPC .. H04W 36/30; H04W 36/0016; H04W 36/00; H04W 76/066; H04L 5/0092; H04B 7/26

(Continued)

(56) References Cited

U.S. PATENT DOCUMENTS 8,526,953 B2 * 9/2013 Alanara ............... H04W 12/06
370/331
8,855,633 B2 * 10/2014 Wu ...................... H04W 48/08
455/426.1

(Continued)

FOREIGN PATENT DOCUMENTS

WO WO-2015175135 A1 11/2015

OTHER PUBLICATIONS

"International Application Serial No. PCT/US2015/025954, International Search Report mailed Jul. 24, 2015", 3 pgs.

(Continued)

*Primary Examiner* — Lester Kincaid
*Assistant Examiner* — Gary Lafontant
(74) *Attorney, Agent, or Firm* — Schwegman Lundberg & Woessner, P.A.

(57) ABSTRACT

A proposed 3GPP LTE protocol enhancement disclosed herein enables an Evolved Node B (eNB) to perform a mass handoff of User Equipment from Licensed Shared Access (LSA) band spectrum to LTE Primary band spectrum without creating an over-the-air signaling surge by preventing individual handover messaging exchanges between the eNB and UEs affected by loss of LSA frequency band. A User Equipment (UE) comprises a transceiver configured to receive a broadcast paging message in a Licensed Shared Access (LSA) frequency band instructing the UE to move to a primary Long Term Evolution (LTE) frequency band from the LSA frequency band, receive system information comprising primary LTE frequency band information, extract handover parameters from the received system information for moving to the primary LTE frequency band, stop communicating on the LSA frequency band and synchronize communications with an Evolved Node B (eNB) associated with the primary LTE frequency band.

24 Claims, 5 Drawing Sheets

(58) Field of Classification Search
USPC .......................... 455/436, 437; 370/329, 331
See application file for complete search history.

(56) References Cited

U.S. PATENT DOCUMENTS

| | | | | |
|---|---|---|---|---|
| 2011/0263259 | A1* | 10/2011 | Yamagishi | H04W 36/0055 455/436 |
| 2014/0051449 | A1* | 2/2014 | Yerrabommanahalli | H04W 36/30 455/439 |
| 2014/0321425 | A1* | 10/2014 | Mueck | H04W 76/066 370/331 |
| 2015/0181575 | A1* | 6/2015 | Ng | H04L 5/0092 370/329 |
| 2015/0223117 | A1* | 8/2015 | Jha | H04W 36/0016 455/436 |

OTHER PUBLICATIONS

"International Application Serial No. PCT/US2015/025954, Written Opinion mailed Jul. 24, 2015", 4 pgs.
Ericsson, "Spectrum sharing", Ericsson White paper, Uen 284, (Oct. 2013), 23-3205.
ETSI, "ERM SRdoc Mobile broadband services in the 2300-2400 Mhz frequency band under LSA regime", TR 103 113 v1.1.1, (Jul. 2013).
Palola, Marko, et al., "Live field trial of LSA concept using LTE network in 2.3 GHz band, 2014 IEEE International Symposium on Dynamic Spectrum Access Networks (DYSPAN)", (Apr. 2014).

* cited by examiner

REDUCED HANDOVER LATENCY FOR LICENSED SHARED ACCESS

TECHNICAL FIELD

Examples generally relate to Long Term Evolution (LTE) networks. One or more examples relate to the implementation of Licensed Shared Access (LSA) in LTE networks.

BACKGROUND

Wireless communication systems are widely deployed to provide various types of communication content such as voice, data, and other media. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems. All multiple access wireless communication systems require sufficient access to available radio spectrum for supporting bearer service requirements.

Licensed Shared Access (LSA) is a new innovative framework that enables more efficient usage of available spectrum by allowing coordinated shared access to licensed spectrum to address spectrum shortage. Currently, there is no protocol provided in the 3GPP LTE standard for efficient handoff of established bearers during return of shared LSA spectrum resources. Thus, in order to realize the full benefit of proposed dynamic frequency sharing systems, there is now a need for enhancements to current handoff signaling in a 3GPP LTE standard.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Figure 1:
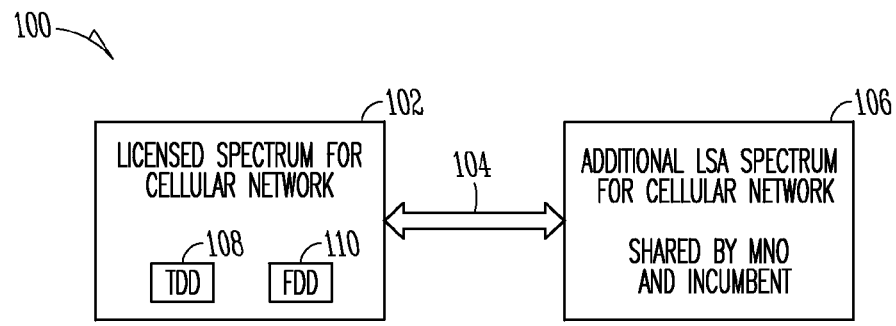
FIG. 1 shows an example of a high level block diagram for dynamic frequency sharing in a cellular network, according to some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments.

The terms "communication station", "station", "handheld device", "mobile device", "wireless device" and "User Equipment" (UE) as used herein refers to a wireless communication device such as a cellular telephone, smartphone, tablet, netbook, wireless terminal, laptop computer, femtocell, High Data Rate (HDR) subscriber station, access point, access terminal, or other personal communication system (PCS) device. The device may be either mobile or stationary.

The term "access point" as used herein may be a fixed station. An access point may also be referred to as an access node, a base station or some other similar terminology known in the art. An access terminal may also be called a mobile station, a user equipment (UE), a wireless communication device or some other similar terminology known in the art.

The terms "relinquish", "release" and "return" are used herein to mean the surrender of LSA spectrum to its incumbent.

Cellular networks, such as LTE, can allow a device to connect to or communicate with other devices. Modern LTE networks can include both large and small cells configured in a Heterogeneous Network (HetNet) configuration. The base stations (e.g., Evolved Node Bs (eNodeBs)) of large and small cells can be configured to operate on different frequency bands. Frequency band(s), i.e, spectrum, adequate for the various types of communication content is required for a base station to connect to, or communicate with, other devices.

Licensed Shared Access (LSA) can significantly enhance the capacity of 3GPP LTE systems by providing a mechanism to extend available spectrum. Currently, a number of LTE compatible spectrum bands (e.g. 100 MHz in 2.3 GHz band, 100+ MHz in 2.6 GHz band) are being considered for LSA application. A LSA spectrum sharing framework is strongly backed and urgently awaited by major wireless equipment vendors, operators, regulators, government bodies and standardization bodies. In this framework, an incumbent spectrum holder allows coordinated shared access to an unused portion of its licensed spectrum by a group of secondary users (i.e, network operators), such that a large portion of wireless spectrum that otherwise remains unused becomes available to network operators for meeting the ever increasing traffic demand over LTE networks.

Even with ongoing innovation to get more and more data rate from the available spectrum, projected traffic growth indicates that the mobile broadband operators will no longer be able to meet the demand with their fixed licensed spectrum because the pool of available spectrum for licensing is limited and cannot grow with the increasing demand. The LSA framework addresses this limitation by allowing an incumbent user, also known as Primary Spectrum Holder (PSH), to share coordinated access to an unused portion of its licensed spectrum with a group of secondary spectrum holders (SSH). The PSH however retains exclusive right to the spectrum and can reclaim the spectrum from SSHs. When using LSA framework to acquire supplemental spectrum, LTE networks are required to adapt to the dynamic nature of the available spectrum by gracefully accommodating spectrum reclamations by PSHs.

An LTE base station Evolved Node B (eNB) release the LSA band once it is notified of an upcoming reclamation by the PSH. If a short grace period is given, the eNB completes steps for the spectrum release within that time. One step of this process is to move, or handover, LTE user equipments (UEs) that are connected through the LSA band to the LTE operator's primary LTE Band. This mass handover may potentially involve moving hundreds of UEs to the operator's primary LTE band simultaneously.

The handover mechanism in the current 3GPP specification is not designed for mass handover scenarios. Without modification, the current handover mechanism creates a very sudden and large spike of over-the-air signaling in the radio access network when the LSA band is released. FIGS. 1-6 detail various handover signaling mechanisms for smooth handover of UEs from LSA bands having an insignificant signaling overhead. Because all, or most, of the affected UEs move within the same physical cell and primary band spectrum, broadcast messaging is used to convey the common parameters for the handover process, rather than current individual handover messaging (and associated overhead) to each UE. The disclosed apparatus and method allows eNBs to complete a mass handover process without receiving individual handover completion messages from UEs, also significantly reducing associated over-the-air signaling overhead.

FIG. 1 shows a high level block diagram illustrating an example of dynamic LSA frequency sharing in a cellular network. FIG. 1 depicts an example of a system 100 that comprises a primary (legacy) band 102 receiving spectrum from or returning spectrum to, at arrow 104, additional LSA spectrum band 106. The primary band 102 may include a Time Division Duplexing (TDD) band 108 or a Frequency Division Duplexing (FDD) band 110. The additional spectrum from the additional LSA band 106 may also be TDD or FDD bands.

Figure 2:
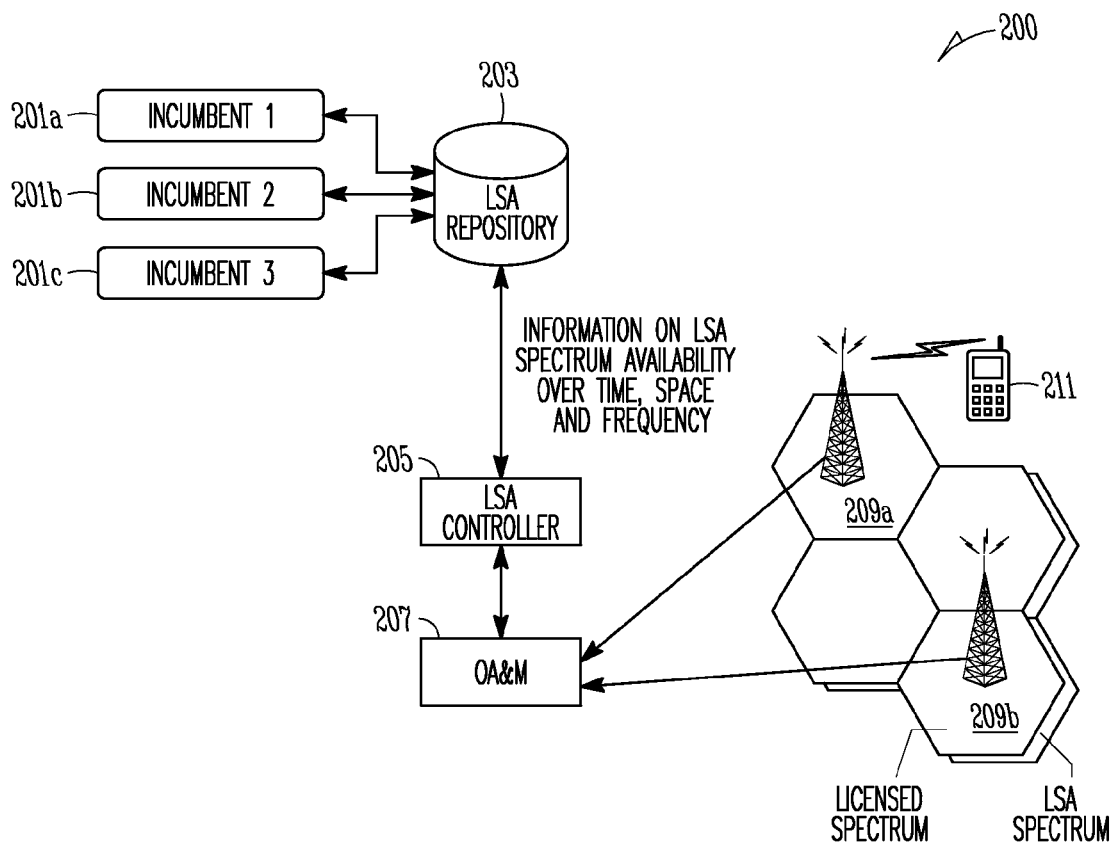
FIG. 2 shows a high level diagram illustrating an exemplary Licensed Shared Access (LSA) system, according to some embodiments.

FIG. 2 shows a high level diagram illustrating an exemplary traditional Licensed Shared Access (LSA) system 200. In a traditional LSA system, Incumbents 201a-c are original spectrum owners. An LSA Repository 203 is a data base containing information on spectrum availability of shorter term aspects of spectrum sharing. The LSA Repository 203 is communicatively coupled to an LSA controller 205, which performs information management and translates LSA Repository 203 data base contents into spectrum access conditions for LSA licensees, while Operator Administration and Management (OA&M) 207 provides operations, administration, and management for the network operator's network. OA&M manages limited short term additional spectrum for the network operator's eNBs, or base stations, 209a-b serving User Equipment 211.

Figure 3:
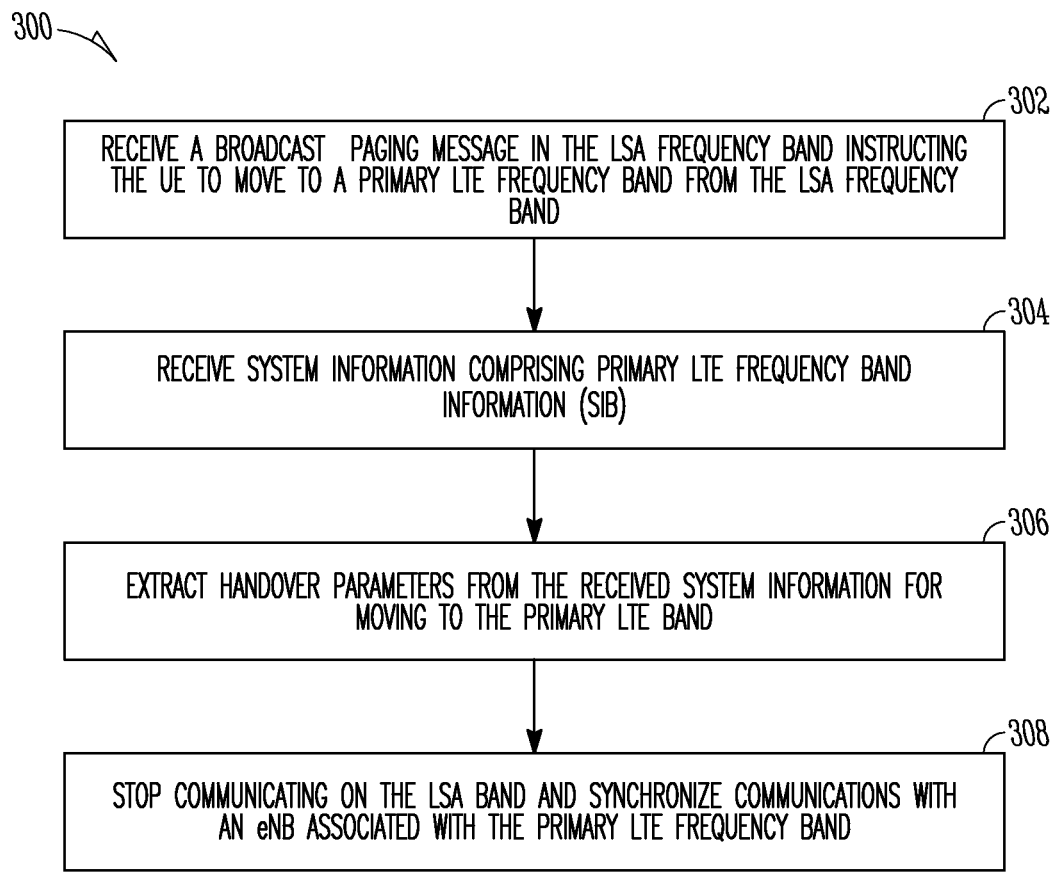
FIG. 3 is a high level overview flow chart illustrating Reduced Handover Latency for Licensed Shared Access, according to some example embodiments.

FIG. 3 is a high level overview flow chart illustrating a method 300 for Reduced Handover Latency for Licensed Shared Access 300 by a UE, according to some example embodiments. An improved signaling mechanism is provided for moving UEs back to primary LTE bands when LSA bands become unavailable, which reduces the large amount of over the air traffic traditionally produced, as well as concomitant handoff latency experienced by users.

Current handover mechanisms in the 3GPP specification, if applied to spectrum release handoff scenarios, will cause a sudden surge of signaling over the air when the eNB 209 is instructed to release the LSA band 106 because the eNB 209 transmits an individual "RRConnectionReconfiguration" message to each of the UEs 211 operating on the LSA band 106. Each of these UEs 211 in turn then transmit an "RRConnectionReconfigurationComplete" message after handover completion. Potentially hundreds of UEs 211 may be involved in this mass handover, resulting in a very high over-the-air signaling surge. The improved signaling mechanism significantly reduce this over-the-air signaling surge by preventing individual handover messaging exchanges between the eNB 209 and the affected UEs 211.

Because a large number of UEs are moving at the same time to the same spectrum band in the same physical cell, a significant amount of signaling overhead can be conserved by broadcasting handover signaling rather than transmitting hundreds of individual messages and receiving an acknowledgement for each one. A Mobility Management Entity (MME) transmits a mass handoff message to the eNB 209 instructing mass handover of multiple UEs 211 from the LSA band 106 to the primary band 102. Rather than current X2 protocol-based handover signaling, this mass handover message instructs the eNB 209 to utilize a novel LSA-specific mechanism to handover the UEs 211 from the LSA band 106 to the primary band 102. This novel LSA-specific mechanism defines a new type of inter-cell handover, where the primary LTE band and the LSA band are effectively utilized through two cells collocated in the same eNB 209.

When the eNB 209 receives this mass handover request, instead of transmitting current individual handover messages (i.e a "RRConnectionReconfiguration" message comprising "mobilityControlInfo") to the connected UEs 211 in the LSA band 106, the eNB 209 broadcasts a paging message in the LSA band 106 instructing these UEs 211 to move to the primary band 102. A novel system information block (SIB) broadcasts common parameters for UEs 211 to return to the primary band 102. The SIB is parsed by the UEs 211 after they receive the paging message alert. The SIB may be transmitted following the paging message, and may be minimally repeated for redundancy until the LSA spectrum release is complete. The eNB 209 will typically be permitted a small time window (i.e, grace period) to complete the handover and release the LSA band 106. An exemplary method for Reduced Handover Latency for LSA is detailed in operations 302-308.

In operation 302, a UE receives a broadcast paging message in the LSA band instructing the UE to move to a primary LTE band from the LSA band. The paging message may comprise an LSA-Handover-Needed indication. Control proceeds to operation 304.

In operation 304, the UE receives a System Information Block (SIB) comprising primary LTE band-related information. A novel SIB, SIB17, dedicated to conveying primary LTE band-related information also includes any additional parameter(s) that may be needed for the UE to reconnect to the primary band. The SIB17 will only be scheduled for broadcast after the paging message has been transmitted and may be repeated for redundancy until the LSA spectrum release is complete. Upon reception of the paging message in operation 302, the UEs will look for the SIB17 in operation 304, and if it is present, will acquire the handover parameters to move to the primary LTE band in operation 306.

In operation 306, the UE reads information relevant to the primary LTE band from SIB17, and may retrieve relevant stored information, which may have been communicated by its eNB earlier. Control proceeds to operation 308.

In operation 308, the UE stops communicating on the LSA band and synchronizes with a cell associated with a primary LTE band.

Figure 4:
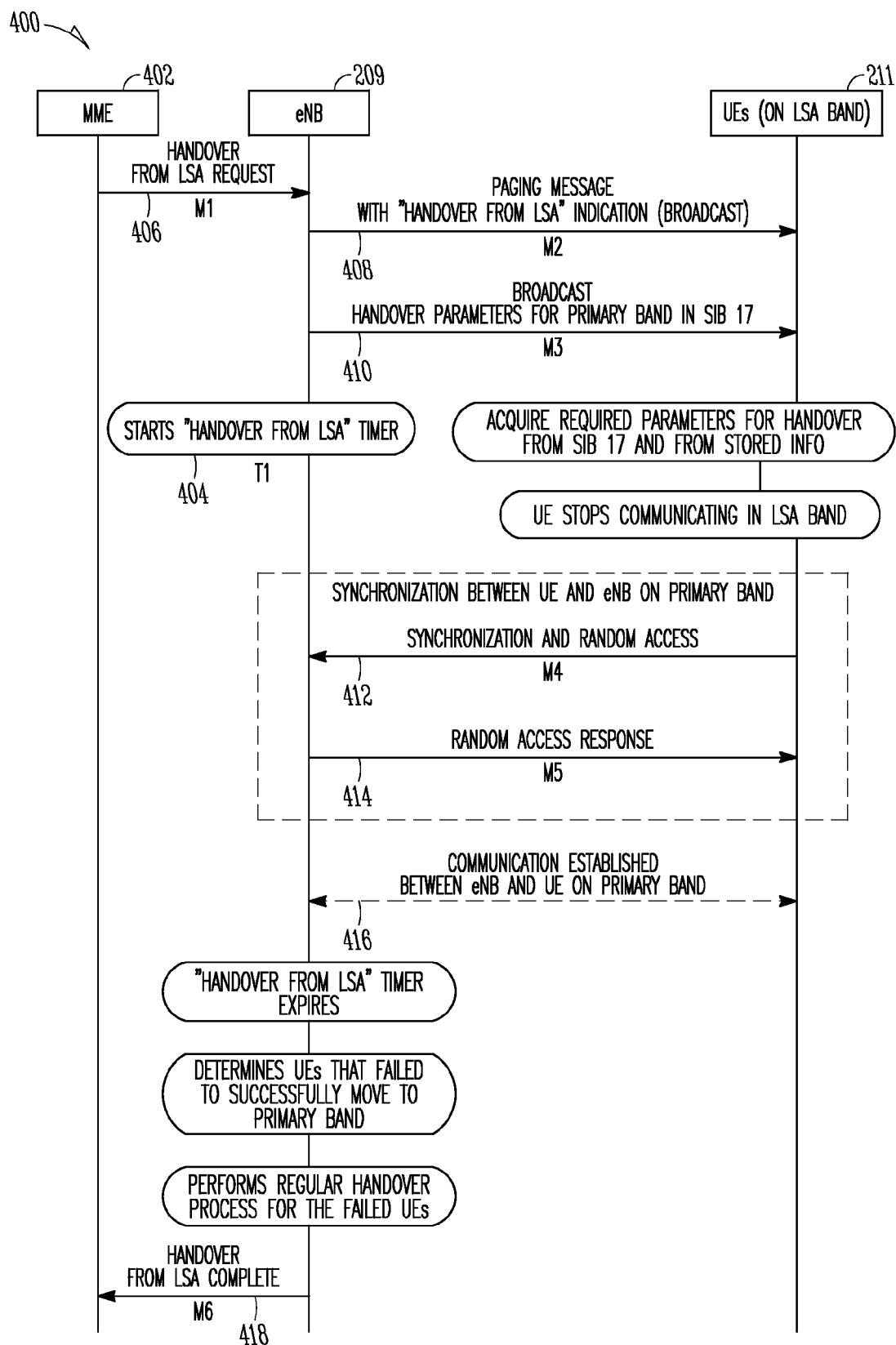
FIG. 4 illustrates an exemplary procedure for Reduced Handover Latency for Licensed Shared Access, according to some embodiments.

FIG. 4 depicts a messaging procedure diagram of a signaling and messaging mechanism 400 for achieving mass handoff in response to an impending loss of relinquished LSA spectrum resources performed by an eNB 209 arranged to send and receive Messages M1-M6 as illustrated. An MME 402 issues a Handover From LSA Request directive in message M1 406 to relinquish LSA band spectrum. The directive M1 406 generates a trigger in the eNB 209 indicating upcoming unavailability of LSA band in the eNBs 209's coverage area. The eNB 209 in turn broadcasts a paging message M2 408 in the LSA band to instruct the UEs 211 to move to the primary LTE band from the LSA band. Updated paging message M2 408 comprises a novel field lsaHandoverNeeded for indicating that handover is compelled due to loss of LSA frequency band resources. The parameter fields of updated paging message M2 408 are shown in Table 1.

TABLE 1

Paging field descriptions cmas-Indication

If present: indication of a CMAS notification.
cn-Domain

Indicates the origin of paging.
eab-ParamModification

If present: indication of an EAB parameters (SIB14) modification.
etws-Indication If present: indication of an ETWS primary notification
and/or ETWS secondary notification.
Imsi The International Mobile Subscriber Identity, a globally unique permanent subscriber identity, see TS 23.003 [27]. The first element contains the first IMSI digit, the second element contains the second IMSI digit and so on.
lsa-HandoverNeeded if present: indication that the UE needs to move out of the LSA band. Handover parameters to move to primary LTE band are available in SIB17.
systemInfoModification If present: indication of a BCCH modification other than SIB10, SIB11, SIB12 and SIB14.
ue-Identity Provides the NAS identity of the UE that is being paged.

After sending the paging message M2 408, the eNB 209 broadcasts handover parameters for its LTE primary band in Message M3 410 comprising SIB17, and starts a Handover From LSA timer T1 404, which expires after a waiting period, the eNB 209 allows for the UEs 211 in the LSA band to complete their handover. When the UE 211 has stopped communicating on the LSA band and has synchronized with the LTE primary band, the UE 211 transmits synchronization and random access (RACH) Message M4 412 to eNB 209. eNB 209 replies with Random Access Response Message M5 414 indicating that the UE 211 has established communication with the eNB 209 on the primary band. Completion of mass LSA handover by an UE 211 is indicated by its successful completion of procedure with the eNB 209.

When the Handover From LSA timer T1 404 expires, the eNB 209 determines whether any UE 211 in the LSA band has failed to successfully complete the RACH procedure and did not succeed in completing the handover. The eNB 209 then implements a traditional handover process by individually transmitting the "RRConnectionReconfiguration" message with "mobilityControlInfo" to these failed UEs 211 as described in 3GPP TS 36.331 section 5.3.5.4.

Figure 5:
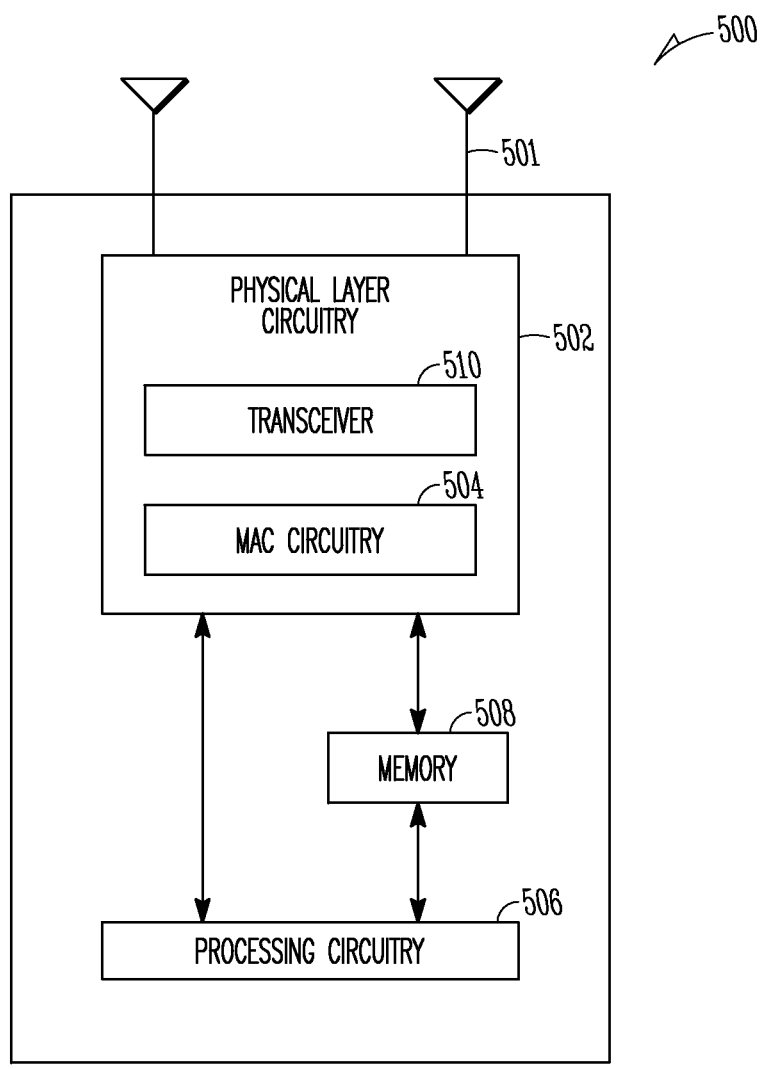
FIG. 5 shows a functional diagram of an exemplary communication station in accordance with some embodiments.

FIG. 5 shows a functional diagram of an exemplary communication station 500 in accordance with some embodiments. In one embodiment, FIG. 5 illustrates a functional block diagram of a communication station that may be suitable for use as an eNB 209 or UE 211 (FIG. 2) in accordance with some embodiments. The communication station 500 may also be suitable for use as a handheld device, mobile device, cellular telephone, smartphone, tablet, netbook, wireless terminal, laptop computer, femtocell, High Data Rate (HDR) subscriber station, access point, access terminal, or other personal communication system (PCS) device.

The communication station 500 may include physical layer circuitry 502 having a transceiver 510 for transmitting and receiving signals to and from other communication stations using one or more antennas 501. The physical layer circuitry 502 may also comprise medium access control (MAC) circuitry 504 for controlling access to the wireless medium. Communication Station 500 may also include processing circuitry 506 and memory 508 arranged to perform the operations described herein. In some embodiments, the physical layer circuitry 502 and the processing circuitry 506 may be configured to perform operations detailed in FIGS. 3 and 4.

In accordance with some embodiments, the MAC circuitry 504 may be arranged to contend for a wireless medium and configure frames or packets for communicating over the wireless medium and the Physical Layer Circuitry 502 may be arranged to transmit and receive signals. The Physical Layer Circuitry 502 may include circuitry for modulation/demodulation, upconversion/downconversion, filtering, amplification, etc. In some embodiments, the processing circuitry 506 of the communication station 500 may include one or more processors. In some embodiments, two or more antennas 501 may be coupled to the physical layer circuitry 502 arranged for sending and receiving signals. The memory 508 may store information for configuring the processing circuitry 506 to perform operations for configuring and transmitting message frames and performing the various operations described herein. The memory 508 may comprise any type of memory including non-transitory memory for storing information in a form readable by a machine (e.g., a computer). For example, a computer-readable storage device may include read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or another device that may receive and/or transmit information wirelessly.

In some embodiments, the communication station 500 may include one or more antennas 501. The antennas 501 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

Figure 6:
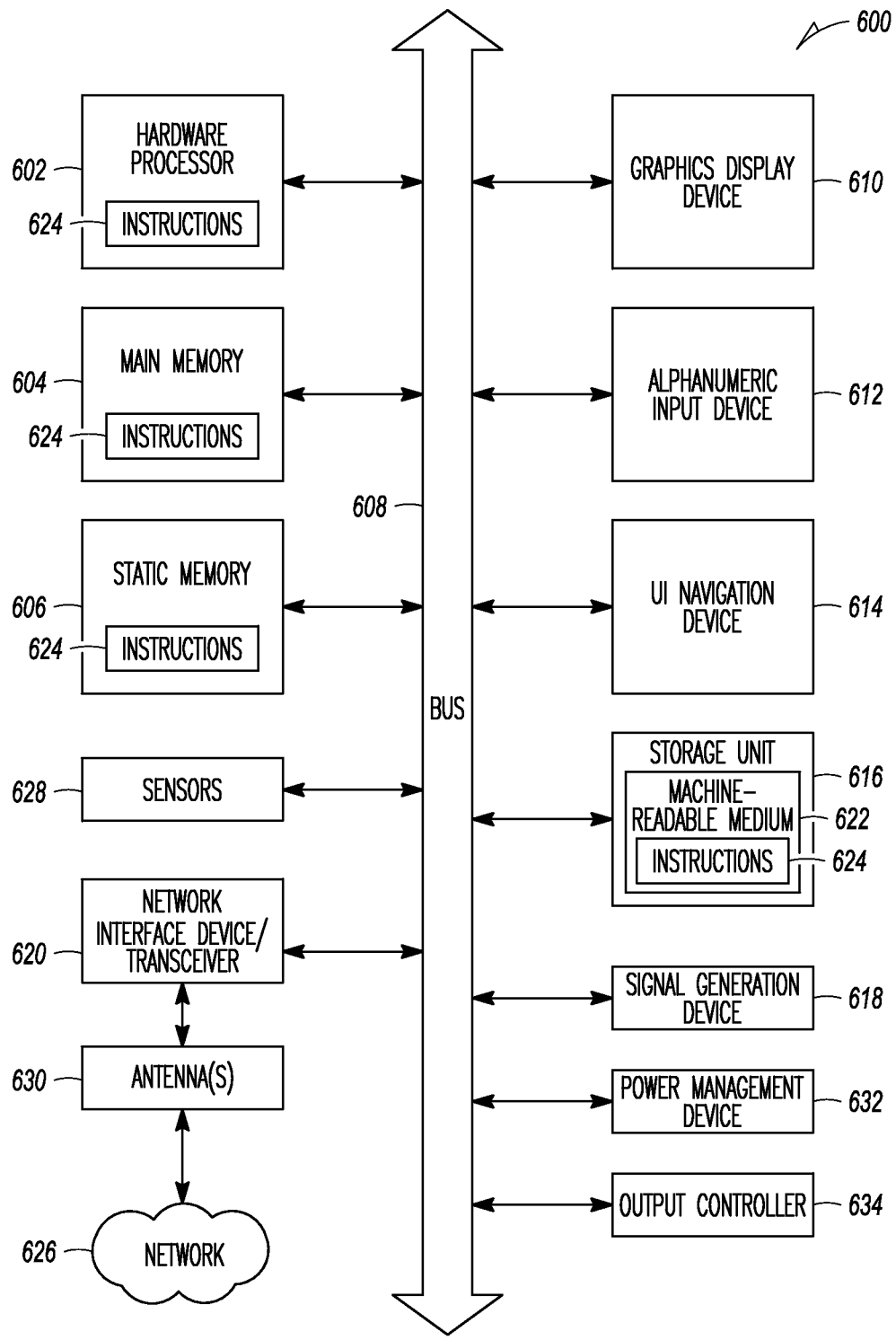
FIG. 6 shows a block diagram of an example of a machine upon which, any of one or more techniques (e.g., methods) discussed herein may be performed.

FIG. 6 illustrates a block diagram of another example machine 600 upon which any one or more of the techniques (e.g., methodologies) discussed herein may performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612 and UI navigation device 614 may be a touch screen display. The machine 600 may additionally include a storage device (i.e, drive unit) 616, a signal generation device 618 (e.g., a speaker), a network interface device/transceiver 620 coupled to antenna(s) 630, and one or more sensors 628, such as a global positioning system (GPS) sensor, compass, accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.)

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible media to facilitate communication of such software.

In one embodiment, a User Equipment (UE) comprises a transceiver configured to receive a broadcast paging message in a Licensed Shared Access (LSA) frequency band instructing the UE to move to a primary Long Term Evolution (LTE) frequency band from the LSA frequency band, receive system information comprising primary LTE frequency band information, extract handover parameters from the received system information for moving to the primary LTE frequency band, stop communicating on the LSA frequency band and synchronize communications with an Evolved Node B (eNB) associated with the primary LTE frequency band.

In another embodiment, an Evolved Node B (eNB) is arranged to perform multiple simultaneous handoffs, the eNB comprising physical layer circuitry and processing elements to receive, from a Mobility Management Entity (MME), a message carrying a Handover From LSA Request, broadcast, in response to the received Handover From LSA Request message, a handover From LSA Paging Message, M2, to User Equipment (UE) communicating on LSA frequency bands, broadcast a message, M3, to the User Equipment (UE) communicating on LSA frequency band, carrying system information comprising primary LTE frequency band information, start a Handover from LSA timer, T1, and receive a Random Access Response (RACH) Message, M4, indicating that the UE has established communication with the eNB on the primary LTE band.

In yet another embodiment, a non-transitory computer readable storage device includes instructions stored thereon, which when executed by a machine, cause the machine to perform operations to receive a broadcast paging message in a Licensed Shared Access (LSA) frequency band instructing an UE to move to a primary Long Term Evolution (LTE) frequency band from the LSA frequency band, receive system information comprising primary LTE frequency band information, extract handover parameters from the received system information for moving to the primary LTE frequency band, stop communicating on the LSA frequency band and synchronize communications with an Evolved Node B (eNB) associated with the primary LTE frequency band.

What is claimed is:

1. A User Equipment (UE) comprising a processor and transceiver configured to:
   determine whether a broadcast paging message in a Licensed Shared Access (LSA) frequency band instructing the UE to move to a primary Long Term Evolution (LTE) frequency band from the LSA frequency band has been received from Evolved Node B (eNB) associated with the primary LTE frequency band;
   after a determination that the broadcast paging message has been received from the eNB, determine whether a system information broadcast has been received from the eNB, the system formation broadcast comprising primary LTE frequency band information;
   after a determination that the system information broadcast has been received from the eNB, extract handover parameters from the received system information broadcast for moving to the primary LTE frequency band; and
   stop communication on the LSA frequency band and synchronize communications with the eNB after extraction of the handover parameters.

2. The UE of claim 1 wherein the system information broadcast comprises a System Information Block (SIB) having a format for carrying primary LTE frequency band information.

3. The UE of claim 1 wherein the system information broadcast comprises a System Information Block (SIB), SIB17.

4. The UE of claim 1 wherein the broadcast paging message comprises an lsa-HandoverNeeded indication.

5. The UE of claim 1 further configured for inter-cell handover, where the primary LTE frequency band and the LSA frequency band are associated with two cells collocated in the same eNB.

6. The UE of claim 1 wherein the broadcast paging message is received when the LSA frequency band has been reclaimed by an incumbent owner.

7. The UE of claim 1 further configured to receive a RRConnectionReconfiguration message with mobilityControlInfo in response to elapse of a predetermined time initiated at transmission of the system information broadcast and prior to synchronization of communications with the eNB via transmission of a Random Access (RACH) message to the eNB and reception of a RACH Response message from the eNB.

8. The UE of claim 1 further arranged to:
   after a determination that the broadcast paging message has not been received from the eNB, determine whether a RRConnectionReconfiguration message with mobilityControlInfo has been received after expiration of a predetermined time initiated at transmission of the system information broadcast; and in response to a determination that the RRConnectionReconfiguration message has been received, engage in a traditional handover process.

9. The UE of claim 1 wherein the paging message comprises a lsaHandoverNeeded field that indicates handover of the UE is compelled due to loss of LSA frequency band resources.

10. An Evolved Node B (eNB) arranged to perform multiple simultaneous handoffs, the eNB comprising physical layer circuitry and processing elements configured to:

receive, from a Mobility Management Entity (MME), a message carrying a Handover From Licensed Shared Access (LSA) Request;

broadcast, in response to the received Handover From LSA Request, a Handover from LSA Paging Message, M2, to User Equipment (UE) communicating on an LSA frequency band(s);

after broadcast of M2 and prior to broadcast of a handover message directed to the UE, broadcast a message, M3, to the UE communicating on Licensed Shared Access (LSA) frequency band(s), carrying system information comprising information of a primary Long Term Evolution (LTE) frequency band;

start a Handover from LSA timer, T1; and determine whether a Random Access Response (RACH) Message, M4, has been received from the UE indicating that the UE has established communication with the eNB on the primary LTE band.

11. The eNB of claim 10 further arranged to transmit a RACH Response message, M5, in response to a determination that the RACH message has been received.

12. The eNB of claim 10 further arranged to implement, after expiration of the Handover from LSA timer T1, a traditional handover process that is configured to individually transmit an "RRConnectionReconfiguration" message with "mobilityControlInfo" to any UE from which M4 has not been received.

13. The eNB of claim 10 further arranged to transmit the system information in a System Information Block (SIB) having a format for carrying the primary LTE frequency band information.

14. The eNB of claim 10 further arranged to transmit the system information in a System Information Block (SIB), SIB17.

15. The eNB of claim 10 further arranged to transmit a broadcast paging message comprising an lsa-HandoverNeeded indication.

16. The eNB of claim 10 further arranged to transmit the broadcast paging message to prevent an over-the-air signaling surge by preventing individual handover messaging exchanges between the eNB and UEs affected by a loss of the LSA frequency band.

17. The eNB of claim 10 further arranged to, in response to a determination that M4 has been received from a particular UE, avoid a traditional handover process with the particular UE to establish communication with the LE on the primary LTE frequency band.

18. A non-transitory computer readable storage device including instructions stored thereon, which when executed by a machine, cause the machine to perform operations comprising:

determining whether a broadcast paging message in a Licensed Shared Access (LSA) frequency band instructing the machine to move to a primary Long Term Evolution (LTE) frequency band from the LSA frequency band has been received from an Evolved Node B (eNB) associated with the primary LTE free frequency band;

in response to a determination of reception of the broadcast paging message, determining whether a system information broadcast comprising primary LTE frequency band information has been received;

in response to a determination that the system information broadcast has been received, extracting handover parameters from the received system information broadcast for moving to the primary LTE frequency band; and stopping communication on the LSA frequency band and synchronizing communications with the eNB after extraction of the handover parameters.

19. The non-transitory computer readable storage device of claim 18 wherein the system information broadcast comprises a System Information Block (SIB) having a format for carrying the primary LTE frequency band information.

20. The non-transitory computer readable storage device of claim 18 wherein the system information broadcast comprises a System Information Block (SIB), SIB17.

21. The non-transitory computer readable storage device of claim 18 wherein the broadcast paging message comprises an lsa-HandoverNeeded indication.

22. The non-transitory computer readable storage device of claim 18 wherein the instructions stored thereon cause the machine to perform operations further comprising:

determining whether a RRConnectionReconfiguration message with mobilityControlInfo has been received after expiration of a predetermined time initiated at transmission of the system information broadcast and prior to synchronization of communications with the eNB; and in response to a determination that the RRConnectionReconfiguration message has been received, engage in a traditional handover process.

23. The non-transitory computer readable storage device of claim 18 wherein the primary LTE frequency band and the LSA frequency band are associated with two cells collocated in the same eNB.

24. The non-transitory computer readable storage device of claim 18 wherein synchronizing communications with the eNB occurs via transmission of a Random Access (RACH) message to the eNB and reception of a RACH Response message from the eNB.

* * * * *

UNITED STATES PATENT AND TRADEMARK OFFICE
CERTIFICATE OF CORRECTION

PATENT NO. : 9,560,558 B2  
APPLICATION NO. : 14/280149  
DATED : January 31, 2017  
INVENTOR(S) : Rashid et al.

Page 1 of 1

It is certified that error appears in the above-identified patent and that said Letters Patent is hereby corrected as shown below:

In the Claims

In Column 10, Line 24, in Claim 1, after "from", insert --an--

In Column 10, Line 30, in Claim 1, delete "formation" and insert --information-- therefor In Column 10, Line 57-58, in Claim 7, delete "mobilityControfInfo" and insert --mobilityControlInfo-- therefor In Column 12, Line 1, in Claim 17, delete "LE" and insert --UE-- therefor In Column 12, Line 12, in Claim 18, after "LTE", delete "free"

Signed and Sealed this  
Fifth Day of May, 2020

Andrei Iancu  
*Director of the United States Patent and Trademark Office*